(12) United States Patent
Lamere

(10) Patent No.: US 7,678,984 B1
(45) Date of Patent: Mar. 16, 2010

(54) METHOD AND APPARATUS FOR PROGRAMMATICALLY GENERATING AUDIO FILE PLAYLISTS

(75) Inventor: Paul B. Lamere, Nashua, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 1189 days.

(21) Appl. No.: 11/250,085

(22) Filed: Oct. 13, 2005

(51) Int. Cl.
*G10H 7/00* (2006.01)

(52) U.S. Cl. .............................. 84/615; 84/601; 84/602; 84/604; 84/634

(58) Field of Classification Search .................... 84/615
See application file for complete search history.

(56) References Cited

U.S. PATENT DOCUMENTS

| | | | |
|---|---|---|---|
| 6,313,390 B1 * | 11/2001 | Adriaans et al. | 84/645 |
| 6,545,209 B1 | 4/2003 | Flannery et al. | |
| 6,748,395 B1 | 6/2004 | Picker et al. | |
| 7,196,258 B2 | 3/2007 | Platt | |
| 2002/0194984 A1 * | 12/2002 | Pachet | 84/609 |
| 2003/0159566 A1 * | 8/2003 | Sater et al. | 84/615 |
| 2003/0183064 A1 * | 10/2003 | Eugene et al. | 84/609 |

OTHER PUBLICATIONS

Boman, et al, "MusicVis: A Visual Interface for Playlist Generation," Columbia University, Department of Computer Science, New York, NY 10027, www1.cs.columbia.edu/~paley/spring03/assignments/HWFINAL/bgb10/MusicVis_Poster.pdf.

Ronald Rosenfeld, "Two Decades of Statistical Language Modeling: Where Do We Go From Here?", School of Computer Science, Carnegie Mellon University, http://www.cs.cmu.edu/~roni/papers/survey-slm-IEEE-PROC-0004.pdf.

* cited by examiner

*Primary Examiner*—Jeffrey Donels
*Assistant Examiner*—Christopher Uhlir
(74) *Attorney, Agent, or Firm*—Robert C. Kowert; Meyertons, Hood, Kivlin, Kowert & Goetzel, P.C.

(57) ABSTRACT

Method and apparatus for programmatically generating interesting audio file playlists. A playlist generation mechanism may use an N-gram model of audio file ordering patterns found in a collection of human-generated playlists to automatically generate new playlists. Given play histories indicating one or more played audio files as input, statistical methods may be used to look for sequences of audio files that occur a statistically significant number of times in the N-gram model for inclusion in new, interesting playlists that incorporate the human element found in the collection of playlists. In some embodiments, one more backoff probability methods may be used to provide additional candidate audio files for playlists if there is insufficient coverage for an audio file in the N-gram model. In one embodiment, a class-based statistical model incorporating higher-level statistics for the audio files may be used to weight selection of audio file transitions from the N-gram model.

25 Claims, 8 Drawing Sheets

METHOD AND APPARATUS FOR PROGRAMMATICALLY GENERATING AUDIO FILE PLAYLISTS

BACKGROUND OF THE INVENTION

1. Field of the Invention

This invention relates to computer systems, and more particularly to programmatically generating audio file playlists.

2. Description of the Related Art

In previous decades, a listener's collection of audio selections (e.g., music) was pre-organized onto albums, tapes, and/or CDs (for simplicity, referred to collectively herein as "albums"). When a listener wanted to listen to an audio selection, the listener would select an album, cue it up, and listen to it. Today, however, audio file collections may consist of hundreds, thousands, or even millions of individual digital audio files stored as individual files on a computer (e.g., on personal computers, servers, Web servers, etc) or other device such as a portable audio file player (e.g., an MP3 player).

An audio file format is a file format for digitally storing audio data on a computer system or other device or media. There are many file formats for digitally storing audio files. These file formats come in two major groups of audio file formats:

Lossless compression formats (e.g., WAVEform audio format (WAV), PCM, TTA, Free Lossless Audio Codec. (FLAC), AU, Broadcast Wave Format (BWF)).

"Lossy" compression formats (e.g., MPEG Layer 3 Audio File (MP3), Ogg Vorbis (OGG), Windows Media Audio (WMA), Advanced Audio Coding (AAC)).

Selecting and organizing subsets of digital audio files into interesting, human-generated "playlists", that is, ordered lists or sequences of audio files, is a common task of the listener. However, using conventional mechanisms for manually generating playlists, the task may be tedious and difficult, especially when the audio file collection is large and diverse, and when at least some of the devices used as audio file players are small, handheld devices with correspondingly limited user interfaces.

There exists a large number of human-generated playlists. There are, for example, many Web sites on the Internet on which large collections of human-generated playlists may be found. These playlists may be created, for example, by professional DJs, as well as by amateurs with a love of a 'good mix', uploaded to a Web site or Web sites, from where other interested listeners may download interesting playlists for their personal use.

As audio file collections continue to grow, as portable, digital audio file players such as MP3 players continue to become more popular, and as the ability to play digital audio files is incorporated into various other devices such as cell phones, the demand for automated playlist generation mechanisms, to free the user from the need to manually generate playlists, may continue to grow. A goal of automated playlist generation is to automatically generate playlists of songs that may be interesting or pleasing to listeners with a minimum amount of input from the listeners.

A number of mechanisms have been developed to automate the generation of playlists. Some conventional automated playlist generators may generate playlists of audio files randomly selected from an audio file collection, for example a playlist of randomly-selected song from various artists, from a particular artist, or from a particular genre. Some conventional automated playlist generators may provide time-based playlist generation. For example, these playlist generators may generate playlists of audio files that have not been played in a while, or that include a set of audio files that have been most recently played. Some conventional automated playlist generators may provide frequency-based playlist generation. For example, these playlist generators may generate playlists of audio files that have been most frequently played, or that have been infrequently played. Some conventional automated playlist generators may provide content-based playlist generation. For example, these playlist generators may generate playlists of songs that sound similar, for example according to acoustics or clarity. Some conventional automated playlist generators may provide rules-based playlist generation. For example, these playlist generators may provide rules to play top-rated songs (five-star songs). Some rules-based playlist generators may be configured to generate playlists from a combination of one or more of the above, e.g. 35% random, 35% five-star, and 30% of songs never heard. All very mechanical on how they select songs.

However, these conventional automated playlist generation mechanisms typically do not take into account the many human factors involved in making a playlist enjoyable and interesting. Playlists are more than just collections of audio files. The juxtaposition of artists, styles, themes and mood may make the whole greater than the sum of its parts. Conventional automated playlist generation mechanisms typically generate playlists using simple criteria such as acoustic similarity, random selection within a genre, alphabetical by title, and so on. These simple criteria tend to result in playlists that lack the interesting juxtapositions of songs, the "human element", expected by listeners. As such, playlists generated by conventional automated playlist generation mechanisms tend to be less appealing and interesting than those generated by knowledgeable human listeners. The qualities that make a playlist 'interesting' are difficult to quantify. For example, audio files of digitized music may be related by musical theme, lyrical theme, artist, genre, instrumentation, rhythm, tempo, period (e.g., 60s music), energy etc. The subtleties involved are beyond what can be expected of a machine to understand using the conventional automated playlist generation techniques described above.

N-Gram Statistical Algorithms

N-Gram statistical models are well-known methods that have proved to be useful, for example, in modeling language in speech recognition. N-Gram language models are typically used to predict the most likely set of next words. An N-gram in a language model is a subsequence of n characters from a given string after removing all spaces. By converting a string to N-grams, the string may be embedded in a vector space, thus allowing the string to be compared to other strings in an efficient manner. N-grams may be used, for example, to break a large collection of text into sequential groups of strings including two (2-gram, or bi-gram), three (3-gram, or tri-gram), or more characters in order to assess the probability of a character sequence (a string) in the collection. When this is done for a large collection of text, it becomes possible to statistically probabilistically estimate the most common occurrence of given strings in the collection of text. N-grams may also be applied to collections of other types of data than text to perform probability calculations for occurrences of data instances in the collections.

SUMMARY

Embodiments of a method and apparatus for programmatically generating interesting audio file playlists are described. In embodiments, a playlist generation mechanism may use an N-gram model of audio file ordering patterns found in a collection of human-generated playlists to automatically generate new playlists that have more "interesting" orders than playlists automatically generated using conventional mechanisms. Embodiments of the playlist generation mechanism may leverage the available large number of human-generated playlists, for example available collections of human-generated playlists available on various Web sites on the Internet. These human-generated playlists may be collected into a playlist database, an N-gram statistical model of the playlist database may be generated. Given an initial sequence including one or more audio files as input, statistical methods may then be used to look for sequences of audio files that occur a statistically significant number of times in the N-gram model of the playlist database for inclusion in a new, interesting playlist.

How "interesting" is defined is difficult to quantify and difficult to represent in a machine sense. Using playlists of songs as an example, "interestingness" may include melody similarity, lyrics similarity, thematic similarity, two songs released around the same time, songs by the same artist, songs in the same genre, etc. Attempts to automatically generate "interesting" playlists based solely on song content or song titles have been less than satisfactory. Embodiments of the playlist generation mechanism may capture and leverage the "interestingness" inherent in a large number human-generated playlists where there is an interesting juxtaposition of songs as determined by the human creation of the playlists to automatically generate new and more interesting playlists than conventional automatic playlist generation mechanisms.

There may be a large number of audio files referenced in the collected human-generated playlists. However, there may not be sufficient "coverage" for at least some audio files in the collection of playlists. To provide more diversity in audio file transitions where there may be insufficient coverage, at least some embodiments may employ backoff probabilities when audio files or transitions without sufficient coverage are encountered. This allows other possible audio file transitions to be considered for inclusion in the playlists, thus expanding the field of possible next audio files. In one embodiment, for a given N-gram model, "backing off" may be done by falling back on a lower-order N-gram model. In some embodiments, a class-based statistical model may be used as a "backoff" for the selection of at least some audio file transitions in at least some playlists. In the class-based statistical model, higher-level statistics may be collected and maintained for the audio files that may be used in the generation of playlists when there is insufficient coverage. Note that some embodiments may use a combination of a class-based statistical model and a lower-order N-gram model to provide backoff probabilities.

Embodiments of the playlist generation mechanism may provide a simple mechanism for listeners to easily initiate the automatic generation of new and interesting playlists from audio file players including, but not limited to, portable audio file players. For example, a listener may listen to one, two or more audio files, and then select a "continue playlist" interface element on the portable audio file player to initiate the automatic generation of a new and interesting playlist by the playlist generation mechanism starting with the one, two or more audio files in the listener's recent play history.

In one embodiment, the playlist database, the statistical model, and the playlist generator itself may be located on a server or servers and accessible to audio file players via a wired or wireless communications link. "Scaled-down" versions of the playlist generator and/or playlist database located on portable audio file players for automatically generating interesting playlists of audio files in the listener's personal audio file collection are anticipated. Other configurations for the playlist generation mechanism are anticipated.

Figure 1:
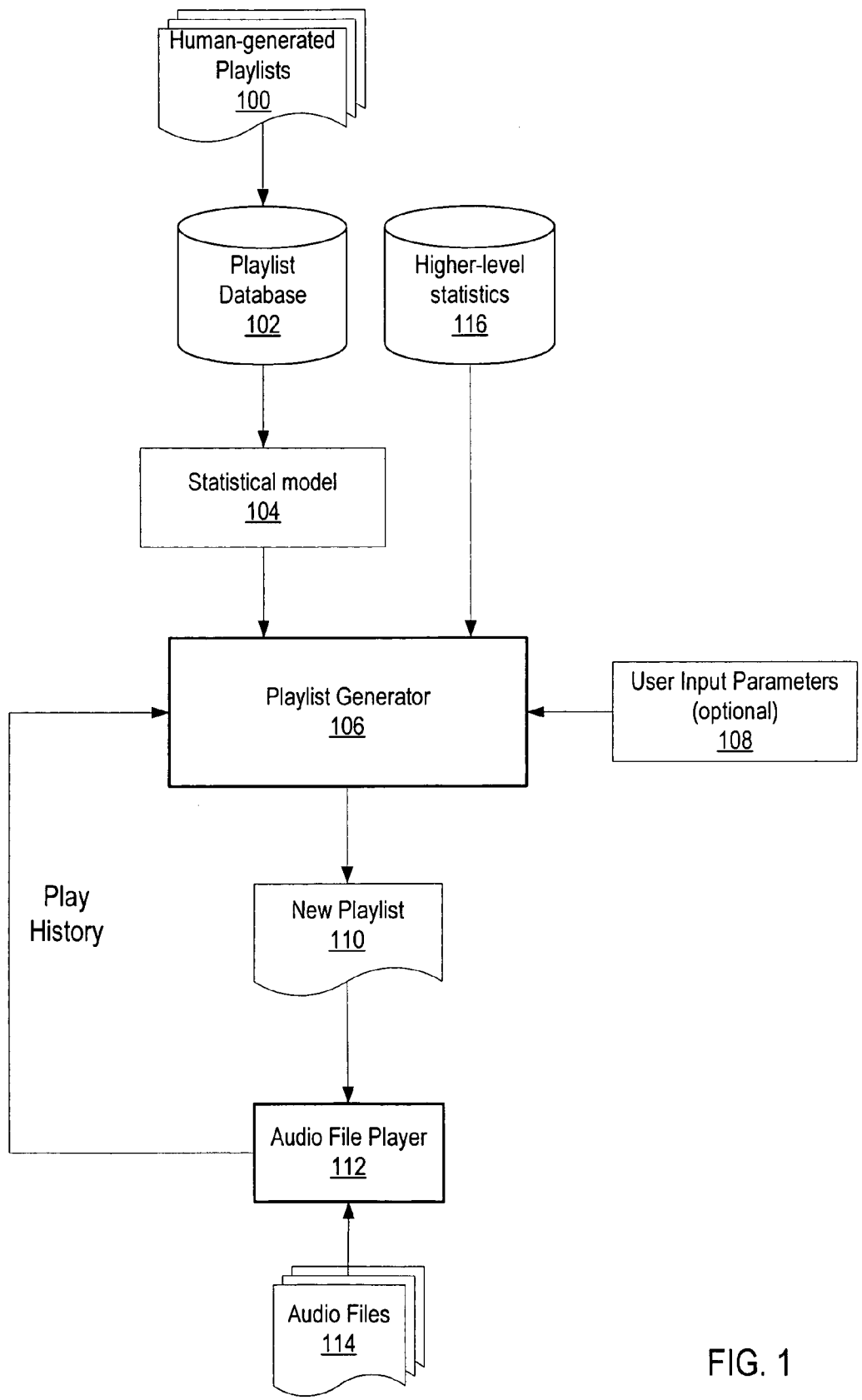
FIG. 1 is a data flow diagram for a playlist generation mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for programmatically generating interesting audio file playlists are described. In embodiments, a playlist generation mechanism may be used to automatically generate new playlists with interesting audio file orders from a statistical model based on collections of human-generated playlists. Embodiments may use an N-gram model of audio file ordering patterns found in the collected human-generated playlists to automatically generate new playlists that have more "interesting" orders. Some embodiments may employ backoff probabilities in the statistical model when audio files or transitions without sufficient coverage are encountered.

Embodiments of the playlist generation mechanism may leverage the available large number of human-generated playlists, for example available collections of human-generated playlists on various Web sites. These playlists are playlists that listeners have created by hand and that the listeners consider interesting. These human-generated playlists may be collected into a database, and statistical methods may then be used to look for sequences of audio files that occur a statistically significant number of times in the playlist database for inclusion in new, interesting playlists.

How "interesting" is defined is difficult to quantify and difficult to represent in a machine sense. Using playlists of songs as an example, "interestingness" may include melody similarity, lyrics similarity, two songs released around the same time, songs by the same artist, songs in the same genre, etc. Attempts to automatically generate "interesting" playlists based solely on song content or song titles have been less than satisfactory. Embodiments of the playlist generation mechanism may capture and leverage the "interestingness" inherent in the large number human-generated playlists where there is an interesting juxtaposition of songs as determined by the human creation of the playlists to automatically generate new and more interesting playlists than conventional automatic playlist generation mechanisms.

Note that the audio files may be songs, and the embodiments described herein may be used to generate song playlists with more interesting song orders than conventional automated song playlist generation mechanisms. However, embodiments may be used to generate interesting playlists for audio files of any type and with any content. Further, note that embodiments may also be applied to generating "playlists" or ordered sequences of other types of files with other types of content, such as media files in general, video files, movie files, image files, text files, HTML files, etc., based upon human-generated playlists or histories of access or use of files of those types.

Embodiments of the playlist generation mechanism may automatically generate interesting playlists by generating, maintaining, and updating a database of human-generated playlists as a Markov model that may be used to probabilistically select a next audio file in a playlist based upon a recent history of played audio files. In one embodiment, an N-gram playlist model may be used to guide the selection of the next audio file in a playlist based upon the previous ordered set of audio file in the playlist. Using N-gram playlist models, new playlists may be automatically generated that include audio file transitions that have been automatically and intelligently selected from a large number of human-generated playlists, thus generating more interesting playlists than conventional automated playlist generations methods by incorporating the audio file transitioning preferences of a large number of listeners.

In the N-gram model, to determine audio file transitions when generating a playlist, embodiments may begin with an audio file A, for example from a play history of a user. A 1-gram model would determine the 1-gram probability that the next song is audio file A. For example, the 1-gram probability may be determined to be 1 in 20000. Given audio file A, the 2-gram, or bi-gram, model would determine the bi-gram probability that the next audio file is audio file B. For example, the 2-gram probability that the next audio file is audio file B may be determined to be 1 in 1000. The 3-gram, or tri-gram, model begins with two audio files, say audio file A and audio file B, from a play history and determines the tri-gram probability that the next audio file is audio file C. Higher order N-gram models operate similarly.

There may be a large number of audio files, thousands or even millions, referenced in the collected human-generated playlists. However, there may not be sufficient "coverage" for at least some audio files in the collection of playlists (the playlist database). In the bi-gram model, given an audio file A, audio file A may appear X times in the playlists. Appearing in transition after audio file A in the playlists, there may be Y other different audio files to form the bi-gram. If Y or both X and Y are significantly small when compared to the total number of audio files in the playlist database, then audio file A may be said to not have sufficient coverage in the bi-gram statistical model of the playlist database. Similarly, coverage may be a concern with other N-gram models. For example, in the tri-gram model, a transition (audio file A>>>audio file B) may not have sufficient coverage in the playlist database. The value for Y (i.e., the number of other different audio files to form the tri-gram) may be small, and thus the transition may not have sufficient coverage.

Using an N-gram model based solely on audio file order/transitions in the playlist database, when a particular audio file A (in the bi-gram model), or a transition (e.g., audio file A>>>audio file B, in the tri-gram model) without sufficient coverage is encountered, only one of the other Y audio files will follow in the playlist. To avoid this, and to provide more diversity in audio file transitions, at least some embodiments may employ backoff probabilities in the statistical model when audio files or transitions without sufficient coverage are encountered. This allows other possible audio file transitions to be considered for inclusion in the playlists, thus expanding the field of possible next audio files. In one embodiment, for a given N-gram model, "backing off" where there is insufficient coverage may be done by falling back on a lower-order N-gram model. As an example, for the tri-gram model, to "backoff" for audio files that do not have sufficient coverage, an embodiment of the playlist generation mechanism may "fall back" on a bi-gram model.

In some embodiments, a class-based statistical model may be used as a "backoff" for the selection of at least some audio file transitions in at least some playlists. In the class-based statistical model, higher-level statistics may be collected and maintained for the audio files that may be used in the generation of playlists when the data in the playlist database is too sparse (i.e., when at least some audio files do not have sufficient coverage) to generate interesting and diverse playlists according to an N-gram model based solely on audio file order.

As an example, if the audio files are songs, the higher-level statistics that may be used for backoff probabilities when a song does not have sufficient coverage may include one or more of, but are not limited to: the probability that the next song is from the same album as the current song: the probability that the next song is from the same artist as the current song; the probability that the next song is in the same genre as the current song; the probability that the next song is thematically similar to the current song; etc. Thus, again using songs as an example, when there is insufficient coverage for a song, embodiments may consider probabilities not just based on song titles but also or instead on one or more of genre, artist, or other collected statistics about the songs. For example, after a song A or a song transition, one or more of other songs by the same artist, other songs from the same album, other songs from the same genre, other songs from other artists from the same era, etc., may be considered for inclusion as a next song in the playlist, rather than selecting a next song based solely on song ordering in the collected playlists using an N-gram model. Providing the option to fall back on backoff probabilities expands the field of audio file transitions that may be considered in the N-gram model, thus keeping the N-gram model from being limited in available audio file transitions where there is insufficient coverage for at least some audio files.

Note that some embodiments may use a combination of a class-based statistical model and a lower-order N-gram model to provide backoff probabilities.

Some embodiments may provide one or more tuning parameters that may be used to "tune" the statistical model and/or the playlist generator. For example, the number of audio files that follow a given audio file below which the given audio file has insufficient coverage (Y, in the above examples) may be a tunable parameter. Some embodiments may implement tunable algorithms that may be used to determine if certain patterns are not statistically significant in the statistical model and use that information to "prune" the statistical model. For example, given an audio file A, there may be one or more audio files that follow audio file A in the collected playlists in the playlist database a statistically insignificant number of times (e.g., M or fewer times, where M is tunable). Including such statistically insignificant information for all the audio files in the statistical model may result in an unnecessarily large database, and in any case, the information is not statistically significant, and thus may impede the generation of interesting playlists. Thus, some embodiments may provide the ability to tune one or more parameters (including, but not limited to, M) that may be used when creating or updating the statistical model that help to insure that the statistical model is composed of statistically significant patterns.

The user interfaces of portable audio file players may make the task of manually generating playlists tedious. Embodiments of the playlist generation mechanism may provide a simple mechanism for listeners to easily initiate the automatic generation of new and interesting playlists. Many listeners listen to audio files on portable audio file players (e.g., MP3 players). These typically small devices may have some local storage (e.g., a hard disk or memory card), on which some audio files may be stored, and on which playlists may be stored. On many such devices, particularly the smaller ones, this storage may be limited. Thus, large collections of audio files may be stored remotely, for example on a listener's home computer or on a network server (e.g., an Internet Web site), and may be downloaded or streamed to play on the portable audio file player. In one embodiment, the playlist database, the statistical model, and the playlist generator itself may be located on a personal computer or a networked server or servers (e.g., an Internet Web site) and accessible to the portable audio file players (and other devices) via a wired or wireless communications link. Thus, the playlist database and statistical model, which may be quite large, and the playlist generator itself may not be located on the portable audio file player. Note, however, that "scaled-down" versions of the playlist generator and/or playlist database located on portable audio file players for automatically generating interesting playlists of audio files in the listener's personal audio file collection are anticipated.

Embodiments of the playlist generation mechanism may provide a simple interface element on portable audio file players through the selection of which a listener may initiate the automatic generation of new, interesting playlists based, for example, on a recent play history by the remotely located playlist generator. For example, a listener may listen to one, two or more audio files, and then select a "continue playlist" interface element on the portable audio file player to initiate the automatic generation of a new and interesting playlist by the playlist generator starting with the one, two or more audio files in the listener's play history. Note that embodiments may provide one or more other mechanisms through which a user may initiate the generation of a new playlist other than by submitting a recent play history.

Embodiments of the playlist generation mechanism are not limited to use in automatically generating playlists for portable audio file players. Embodiments of the playlist generation mechanism may also be used to automatically generate interesting playlists for playing audio files via audio file player applications located on personal computers, notebook computers, or any other computer system or device that may host an instance of an audio file player application. For simplicity, portable audio file players and audio file player applications may be referred to collectively herein as "audio file players."

In one embodiment, an audio file player may be configured to track the play history of the listener, including relevant information about the audio files that the listener plays. A most recent portion of this tracked information may be provided to the playlist generator by the portable audio file player for use in automatically generating interesting playlists from the collection of playlists in the playlist database. The audio file player may also track and manage the audio files to which the listener has access. An audio file player may, in this respect, be viewed as a "media manager." Listeners may, for example, purchase audio files (e.g., digital music files) from the Internet, copy audio files from CDs, belong to an audio file subscription service, and/or obtain audio files from other sources. The audio file player may be used to track and manage all of the listener's available audio files. Beyond just selecting and listening to audio files, some audio file players, for example, allow the listener to sort the audio files by genre, artist, album, or other criteria. In one embodiment, the listener's audio file player may be responsible for providing the playlist generator with information on what audio files the listener has access to for use in generating playlists for the listener, in addition to providing play histories.

A listener may have access to a Web music service where, typically for a subscription fee, the listener obtains access to download a virtually unlimited library of audio files off a feed. In one embodiment, the playlist generator may be configured to automatically generate interesting playlists from the Web music service's library based, for example, on play histories of listeners that are customers of the Web music service. Note that the playlist database may encompass a large number of human-generated playlists referencing audio files from that library.

In at least some embodiments, the playlist generator may be configured to automatically generate interesting playlists based upon other input than a listener's play history. For example, one embodiment may provide an interface through which a listener may submit a list of titles of one or more audio files that the listener likes and to request that an interesting playlist or playlists be generated from the provided list of audio file(s). As another example, one embodiment may provide an interface through which a listener may provide audio file "class" information as input to the playlist generation process for use in determining initial audio files for a playlist. This class information may include one or more of, but is not limited to, an artist, an album, a genre, a theme, an era (e.g., 60s music), etc. The playlist generator may then, from this input class information, select, randomly or otherwise, one or more audio files from the playlist database as initial audio files for a new playlist in accordance with the input information. From the initial audio files, the playlist generator may then generate a new playlist of audio files using the N-gram statistical model of the playlist database, possibly weighted with a class-based statistical model of the playlist database. In some embodiments, however the initial audio files to begin a new playlist are determined, the playlist generator may use backoff probabilities to expand the set of candidate audio files for inclusion in the playlist if there is insufficient coverage.

FIG. 1 is a data flow diagram for a playlist generation mechanism according to one embodiment. Human-generated playlists 100 may be collected from one or more sources to generate a playlist database 102. Note that audio files 114 that are referenced in a particular playlist 100 in the database 102 may appear in many of the other playlists 100. In one embodiment, playlist database 102 may be periodically or aperiodically updated with new human-generated playlists 100 as they become available. Updating the playlist database 102 may reflect the release of new audio files 114 (e.g., the release of new music CDs), changing tastes in listening preferences, and other variable factors that may influence the generation of interesting playlists 110.

A statistical representation or model 104 of the playlist database 102 may be generated that enables the extraction of playlist N-grams. Given a sequence of played audio files 114, playlist N-grams may be used by playlist generator 106 to determine a set of possible next audio files 114 and their associated probabilities based upon the occurrence of that sequence of audio files 114 in the playlist database. Some embodiments may use 2-gram (bi-grams) and/or 3-gram (trigrams) as the N-gram model. Note that other embodiments may use other values for N. In one embodiment, model 104 may be generated in accordance with a Markov model. In one embodiment, statistical model 104 may be periodically or aperiodically updated as new human-generated playlists 100 are added to the playlist database 102.

In one embodiment, a user may listen to audio files 114 via an audio file player 112. Audio file player 112 may be representative of any type of device that is configured to play audio files 114. Examples of audio file players 112 may include, but are not limited to, desktop or portable personal computer systems with applications or utilities (e.g., iTunes, etc.) that play audio files 114 through speakers or earphones connected to the PC, and portable digital audio file players (e.g., various MP3 players, Apple Computer's iPod®, etc.). Note that, as technology advances, other portable consumer devices, such as cell phones, may provide the capability to play audio files 114. Note that home audio systems and automobile audio systems may also be configured to play audio files 112.

Audio files 114 may be in one or more of any audio file format (e.g., MP3, WAV, OGG, AAC, etc). Audio files 114 may be stored locally on the device with audio file player 112 and/or may be stored on a remote device, for example on a server or a personal computer system, and accessible to audio file player 112 through one or more communications links. A communications link may, for example, be a wired or wireless network connection (e.g., to the Internet). Another exemplary communications link is satellite feed. Yet another exemplary communications link is a proprietary link between a portable digital audio file player and a personal computer system that allows the portable digital audio file player to communicate with an application or utility that maintains audio files 114 on the personal computer system, for example a Firewire or USB connection.

Playlist generator 106 may be located on the device that includes the audio file player 112 or, alternatively, may be located on a remote device accessible to audio file player 112 through one or more communications links (e.g., a wired or wireless network connection). Playlist statistics 102 and higher-level statistics 116 may be stored on a server system that hosts playlist generator 106, or alternatively may be stored on a server system that is remotely accessible to playlist generator 106 from another device via one or more communications links (e.g., a wired or wireless network connection).

In one embodiment, as the user plays audio files 114 via audio file player 112, information on one or more audio files 114 that the user plays (the play history) may be provided to playlist generator 106. The audio file player 112 may be configured to automatically provide the play history to the playlist generator 106, or alternatively the play history may be provided to the playlist generator 106 in response to user input. The playlist generator 106 may then use the provided play history to search for sequences of audio files 114 (N-grams) that include or begin with one or more audio file(s) 114 in the play history and that occur a statistically significant number of times in the statistical model 104 of playlist database 102. For example, using a 2-gram model, an audio file A referenced in the play history may be determined by playlist generator 106 to be statistically significantly followed by an audio file B in the statistical model 104 of playlist database 102. When generating a playlist 110 from a play history that includes audio file A, playlist generator 106 may give preference to audio file B as a next song in the playlist 110 based on the statistical correlation between the two audio files.

In one embodiment, once playlist generation has been initiated, the playlist generator 106 may be configured to generate next audio files 114 to be played from the playlist 110 based on the "play history" represented by the audio files 114 in the playlist 110 itself. In the example given above, audio file B may be determined by playlist generator 106 to be statistically significantly followed by an audio file C in the statistical model 104 of playlist database 102, and thus may be provided as the next audio file 114 in the playlist 110; audio file C may be determined by playlist generator 106 to be statistically significantly followed by an audio file D in the statistical model 104 of playlist database 102, and thus may be provided as the next audio file 114 in the playlist 110; and so on. In one embodiment, the process of generating next audio files 114 for the playlist 110 based upon the play history may continue until the user terminates the playing session. Alternatively, a playlist 110 that includes a particular number of audio files 114 (e.g., ten audio files 114), or alternatively a playlist 110 that will play for no more than a particular length of time (e.g., one hour), may be generated by playlist generator 106 and provided to the audio file player 112. The length of the playlist 110 to be generated may be preconfigured, or alternatively may be specified by the user.

The above example describes a case where audio file B is determined from the occurrence of a single audio file, audio file A, in a play history, using a 2-gram statistical model. Note that a next audio file 114 for a playlist may be determined from a transition including two (3-gram) or more (using other values for N) audio files 114 in a play history. For example, using a 3-gram model, a transition (audio file A>>>audio file B) in the play history provided to the playlist generator 106 may be determined by playlist generator 106 to be statistically significantly followed by an audio file C in the statistical model 104 of playlist database 102. When generating a playlist 110 from a play history that includes the transition (audio file A>>>audio file B), playlist generator 106 may give preference to audio file C as a next song in the playlist 110 if the occurrence of audio file C after the transition (audio file A>>>audio file B) is found to be statistically significant in the statistical model 104 of playlist database 102.

Note that, in one embodiment, playlist generator 106 may begin the process of generating a playlist 110 using a 2-gram model to determine a next audio file B that statistically significantly follows a single audio file A from a play history, and then use a 3-gram model to determine a next audio file C that statistically significantly follows the transition (audio file A>>>audio file B). In one embodiment, playlist generator 106 may then continue to use the 3-gram model to determine next audio files 114 for the playlist 110, for example determining a next audio file D that statistically significantly follows the transition (audio file B>>>audio file C). Some embodiments may be configured to use other values for N (e.g., 4-gram) to determine next audio files if there are enough audio files 114 in the play history, and if possible. In one embodiment, the number of audio files 114 in the play history received from the audio file player 112 may determine the N-gram model that is used to initiate the playlist generation process. For example, if there is one audio file 114 in the play history, the playlist generator 106 may at least begin by using a 2-gram model; if there are two audio files 114 in the play history, the playlist generator 106 may at least begin by using a 3-gram model, and so on.

In one embodiment, there may be a maximum level for N (i.e., there may be a maximum order N-gram model which is generated and may be used to locate statistically significant next audio files 114). For example, one embodiment may be configured to use 2-gram and 3-gram statistical models. Note that, if playlist generator 106 cannot locate statistically significant next audio files 114 for the playlist 110 using a particular N-gram model (e.g., 4-gram, or 3-gram), the playlist generator 106 may default to lower order N-gram models (e.g., 3-gram, and then 2-gram) to locate next audio files 114.

In one embodiment, backoff probabilities may be used in handling cases where there is sparse data in playlist database 102 for an audio file 114 or a transition including two or more audio files 114. In this embodiment, a class-based statistical model may be used in the selection of at least some audio files 114 for inclusion in at least some playlists 110. Higher-level statistics 116 may be maintained that may be used by playlist generator 106 to generate playlists 110 when the data in the playlist database 102 is too sparse to generate playlists 110 based solely on audio file 114 order. As an example, if the audio files are songs, these higher-level statistics 116 may include one or more of, but are not limited to:

Song-album: the probability that the next song is from the same album as the current song. (Note that songs may appear on more than one album.)

Song-artist: the probability that the next song is from the same artist as the current song.

Song-genre: the probability that the next song is in the same genre as the current song.

Song-theme: the probability that the next song is thematically similar to the current song.

Higher-level statistics 116 may be maintained, for example, on a per-artist and per-genre level, and may serve as backoff rules in playlist generation when audio file 114 order information in playlist database 102 is sparse or not available (i.e., when at least some audio files have insufficient coverage). Note that, while higher-level statistics 116 are illustrated in FIG. 1 as being separate from playlist database 102, the higher-level statistics 116 may be considered as part of playlist database 102.

In one embodiment, user-specific data may be used in weighting the statistical model 102 when generating playlists 110. In one embodiment, playlist generator 106 may include a user interface that is configured to accept one or more user input parameters to the playlist generation process. These input parameters 108 may include one or more of, but are not limited to, specifications of the names and/or types of artists, musical genres, song ratings, listening frequency, musical periods (e.g., "the '60s", or "the '80s"), etc. In one embodiment, user-provided parameters 108 may be used in combination with the statistical model 104 to generate interesting playlists 110 tailored to the user's specified preferences. Note that user-provided parameters 108 may include other parameters for regulating playlist generation, such as a specification of how many audio files 110 are to be included in a playlist 110, or a maximum or minimum length in time for a playlist (i.e., "generate a playlist that will play for no more than one hour").

As described above, in one embodiment, user-specific data may be collected from user interactions with the playlist generator 106 and used in weighting the statistical model 102 in generating playlists 110 tailored to the user's individual preferences. This user-specific data may include user preferences as specified through user input parameters 108, as described above, and in one embodiment may also include "feedback" information dynamically collected from the user when listening to the audio files 114 referenced in a playlist 110. For example, if an audio file 114 from a playlist 110 is being played, the user may cancel the playing of the audio file 114 or delete the audio file 114 from the playlist 110 if the user does not like the audio file 114. This information may be collected and used by playlist generator 106 to weigh against or exclude N-grams including that audio file 114 in playlist generation for this particular user. Similarly, user interaction or input parameters may be used to weigh against or exclude N-grams including particular artists, albums, genres, etc. in playlist generation for this particular user. For example, if the playlist generation mechanism detects that the user has cancelled several songs from a particular artist, the playlist generator 106 may tend to exclude songs from that artist in playlists 110 for this particular user. Thus, over time, playlist generation for a user may be tailored to the user's individual preferences.

By determining and employing statistical correlations among audio file transitions from a collection of a large number of human-generated playlists 100 to generate new playlists 110, embodiments of the playlist generation mechanism may automatically generate audio file transitions in playlists 110 that are more interesting than can typically be obtained using conventional playlist generation techniques.

FIGS. 2 through 6 illustrate several exemplary configurations for embodiments of a playlist generation mechanism as described herein. Note that these configurations are exemplary, and are not intended to be limiting.

Figure 2:
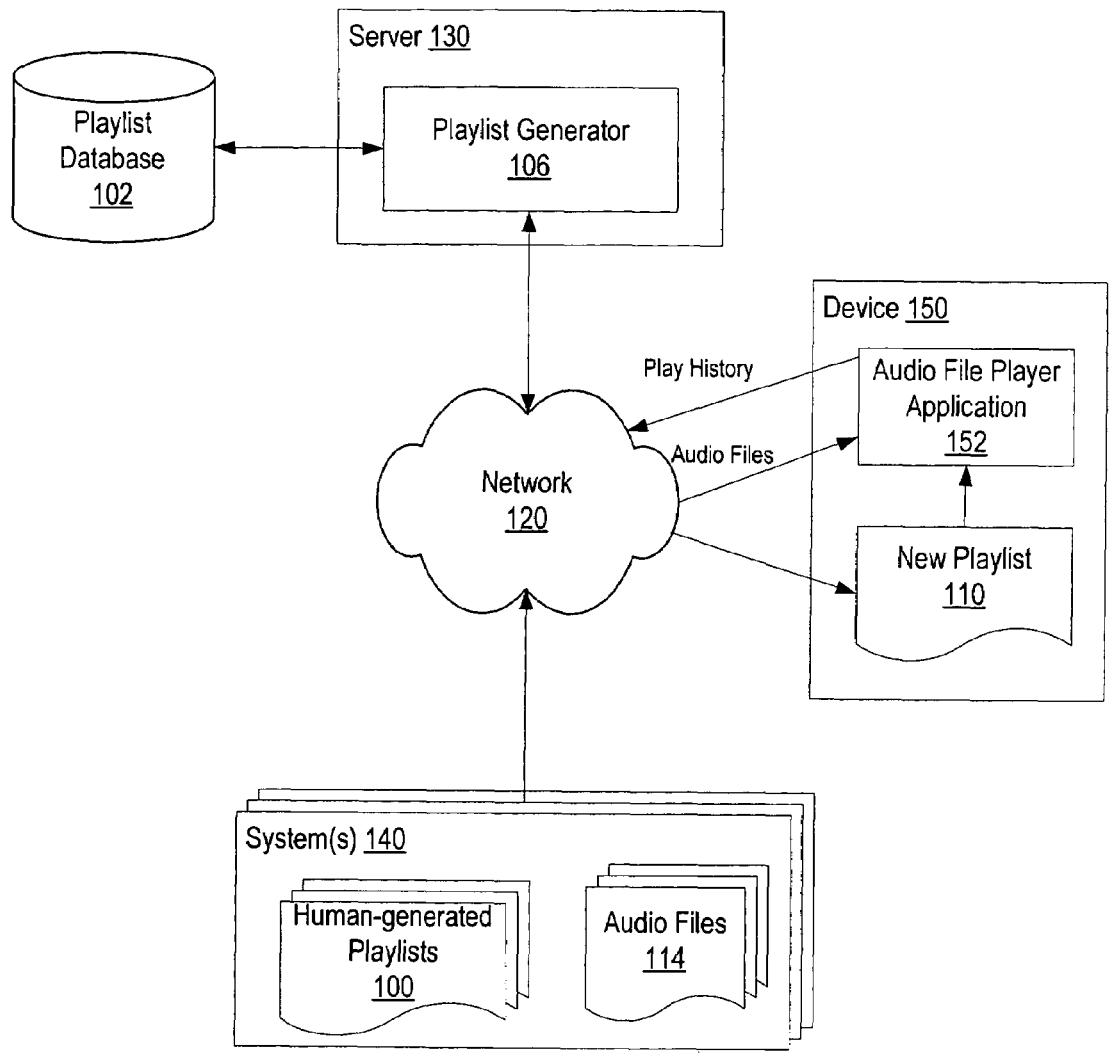
FIG. 2 illustrates an exemplary networked environment including a server hosting a playlist generator and playlist database according to one embodiment.

FIG. 2 illustrates an exemplary networked environment including a server hosting a playlist generator and playlist database according to one embodiment. In this embodiment, a server 130 coupled to a network 120 hosts an instance of playlist generator 106 and playlist database 102. Human-generated playlists 100 may be collected from system(s) 140 and stored in playlist database 102. A statistical model 104 of playlist database 102 may be generated.

A user may play one or more audio files 114 stored on one or more of systems 140 using audio file player application 152 on device 150. Device 150 may, for example, be representative of a personal "desktop" or portable computer system or a portable digital audio file player (e.g., an MP3 player). A play history indicating one or more audio files 114 recently played by the user may be sent to the playlist generator 106 via network 120. The play history may be automatically sent by the audio file player application 152, or alternatively may be sent in response to user input. For example, the user may select a "generate playlist" user interface element from the audio file player application's user interface to initiate the generation of a new playlist 110 from the user's recent play history. Note that a play history may include information on one, two, or more audio files 114 that have most recently been played by the user on device 150.

Upon receipt of the play history, playlist generator 106 may use the information on recently played audio file(s) 114 in the play history to search for sequences of audio files 114 (N-grams) that include or begin with one or more of the audio file(s) 114 in the play history and that occur a statistically significant number of times in the statistical model 104 of playlist database 102. Given the sequence of played audio files 114 in the play history, playlist N-grams may be used by playlist generator 106 to determine a set of possible next audio files 114 and their associated probabilities based upon the occurrence of that sequence of audio files 114 in the playlist database. In one embodiment, the most probable next audio file(s) 114 determined using an N-gram statistical model may then be included in the playlist 110. In some embodiments, various other parameters may be used to weight the probabilities of audio files 114 of the possible next audio files 114. In one embodiment, as previously described, backoff probabilities may be used in handling cases where there is sparse data in playlist database 102 for an audio file 114. Further, information collected from the user's prior interactions with playlist generator 106 may be used in weighting possible next audio files 114 for selecting audio files 114 to be included or excluded from the playlist.

The sequence of one or more next audio files 114 to be played by audio file player application 152 on device 150 may then be returned to device 150 as new playlist 110. Audio file player application 152 may then play the sequence of audio files 114 stored on one or more systems 140 as indicated by the new playlist 110.

Figure 3:
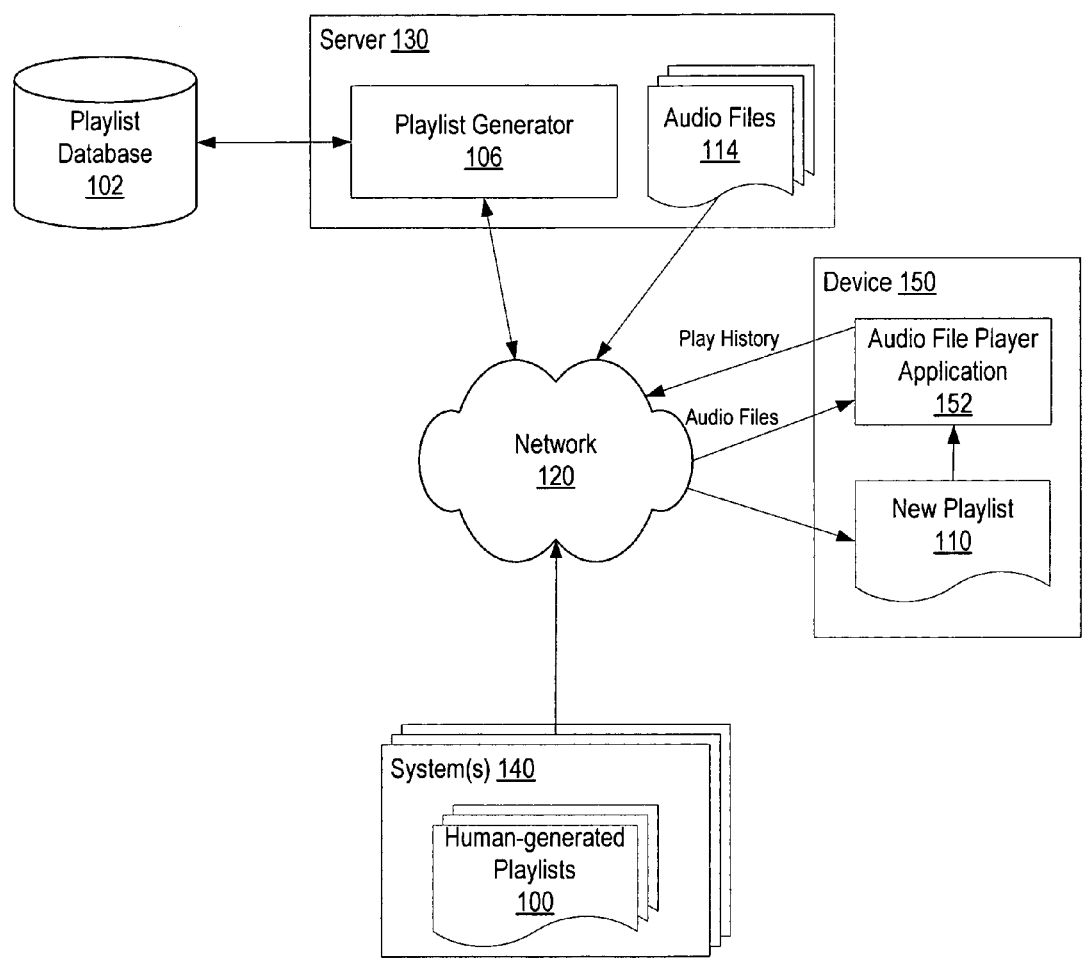
FIG. 3 illustrates an exemplary networked environment including a server hosting a playlist generator, playlist database, and a collection of audio files according to one embodiment.

FIG. 3 illustrates an exemplary networked environment including a server hosting a playlist generator, playlist database, and a collection of audio files according to one embodiment. This embodiment is similar to the embodiment illustrated in FIG. 2, but in this embodiment, the collection of audio files 114 is hosted on server 130 for access by instances of audio file player application 152.

This embodiment may represent, for example, an Internet digital music service provider that may offer the playlist generator 106 as a service to its customers. A customer may subscribe to the digital music service. The digital music service provider may provide an audio file player application 152 through which the user can play music on device 150. The audio file player application 152 may be configured to keep track of what audio files 114 the customer plays (play history) and to provide that play history information to the digital music service. The digital music service may use that information, along with information (human-generated playlists 100 and/or play histories) collected from other customers to generate a database 102 of play history for the audio files 114 in its collection. The digital music service provider may offer playlist generator 106 as a playlist generation service for its customers based on the large database of information of the play history and/or playlists 100 of all of its customers.

Figure 4:
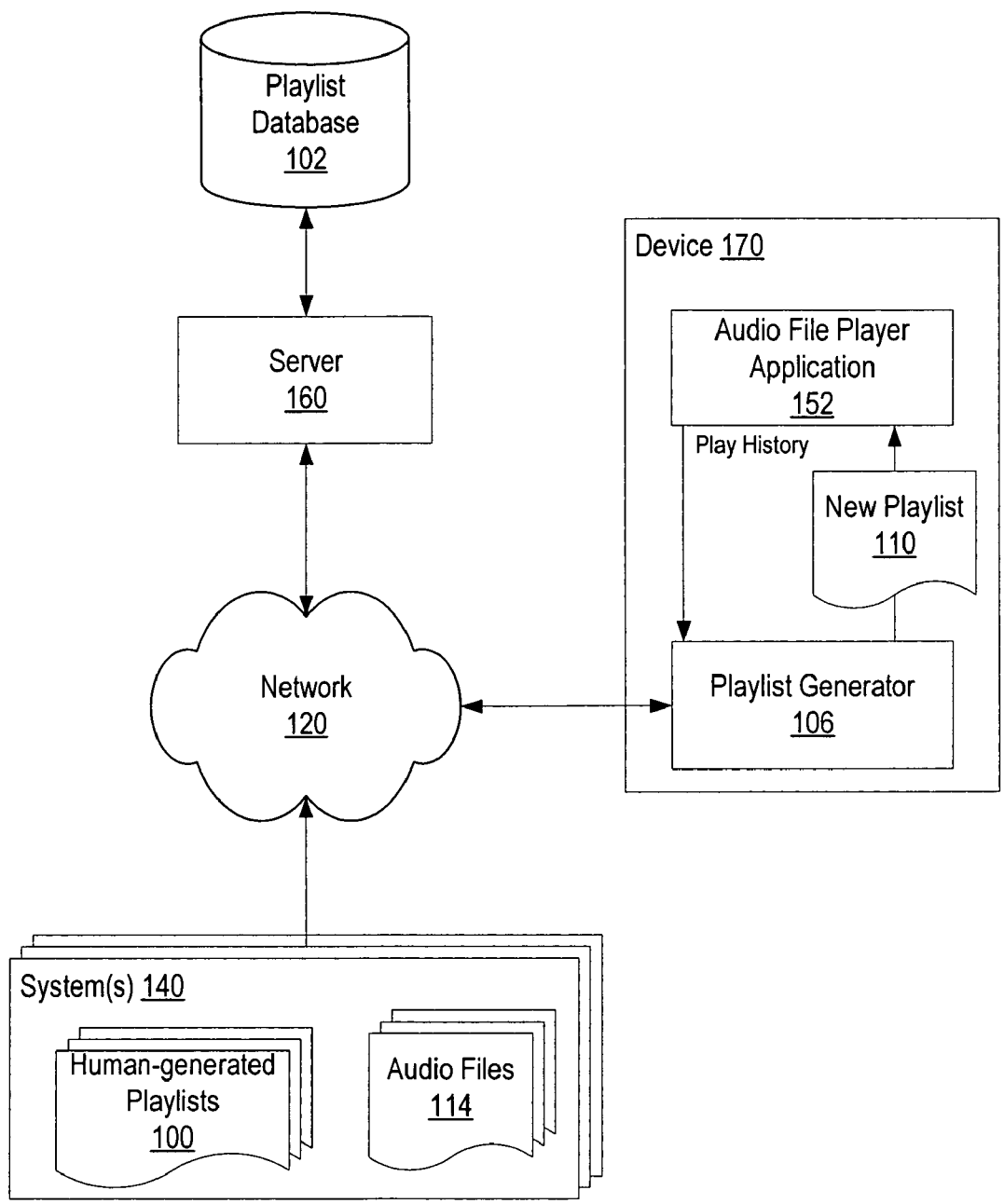
FIG. 4 illustrates an exemplary networked environment including a server hosting a playlist database and a device including a playlist generator and an audio file player application according to one embodiment.

FIG. 4 illustrates an exemplary networked environment including a server hosting a playlist database and a device including a playlist generator and an audio file player application according to one embodiment. In this embodiment, audio files 114 may be stored on one or more systems 140 and remotely accessed by audio file player application 152. Human-generated playlists 100 may be collected, for example from system(s) 140, and stored in playlist database 102. A statistical model 104 of playlist database 102 may be generated.

A user may play one or more audio files 114 stored on one or more of systems 140 using audio file player application 152 on device 170. Device 170 may, for example, be representative of a personal "desktop" or portable computer system or a portable digital audio file player. A play history indicating one or more audio files 114 recently played by the user may be provided to the playlist generator 106 on device 170. Playlist generator 106 may then access the statistical model of playlist database 102 hosted by server 160 to search for sequences of audio files 114 (N-grams) that include or begin with one or more of the audio file(s) 114 in the play history and that occur a statistically significant number of times in the statistical model 104 of playlist database 102, as previously described. The sequence of one or more next audio files 114 to be played by audio file player application 152 on device 170 may then be provided to audio file player application 152 as new playlist 110. Audio file player application 152 may then play the sequence of audio files 114 stored on one or more systems 140 as indicated by the new playlist 110.

Figure 5:
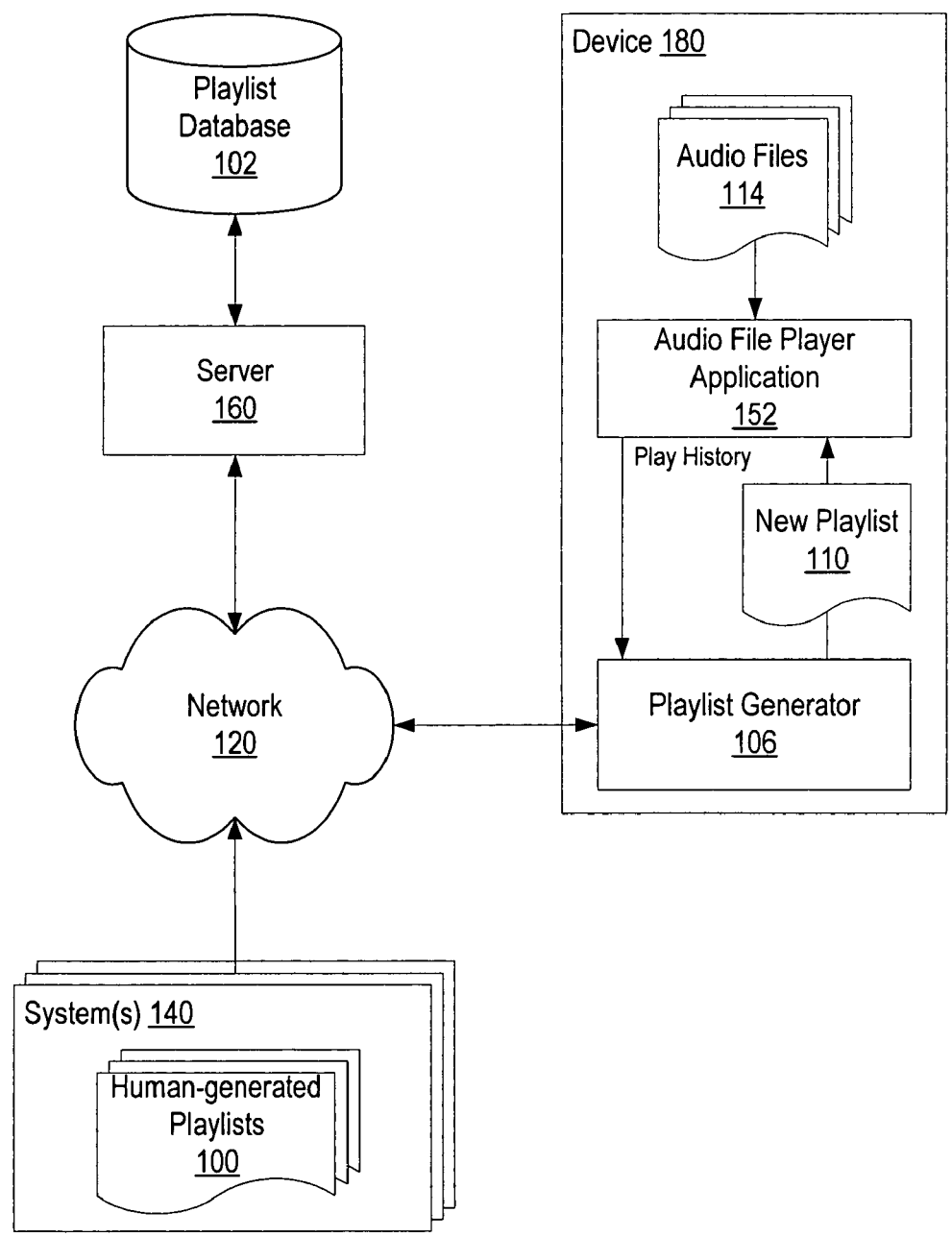
FIG. 5 illustrates an exemplary networked environment with a server hosting playlist database and a device including a playlist generator and audio file player application according to one embodiment.

FIG. 5 illustrates an exemplary networked environment with a server hosting playlist database and a device including a playlist generator and audio file player application according to one embodiment. This embodiment is similar to the embodiment illustrated in FIG. 4, but in this embodiment, the user has a collection of audio files 114 stored on device 180 for access by instances of audio file player application 152.

In other embodiments, audio files 114 may be stored on device 180 and on one or more of system(s) 140 for access by audio file player application 152. In one embodiment, an instance of playlist generator 106 may be hosted on one of systems 140, may remotely access playlist database 102 via network 120, and may be remotely accessed by audio file player application 152 via network 120.

Figure 6:
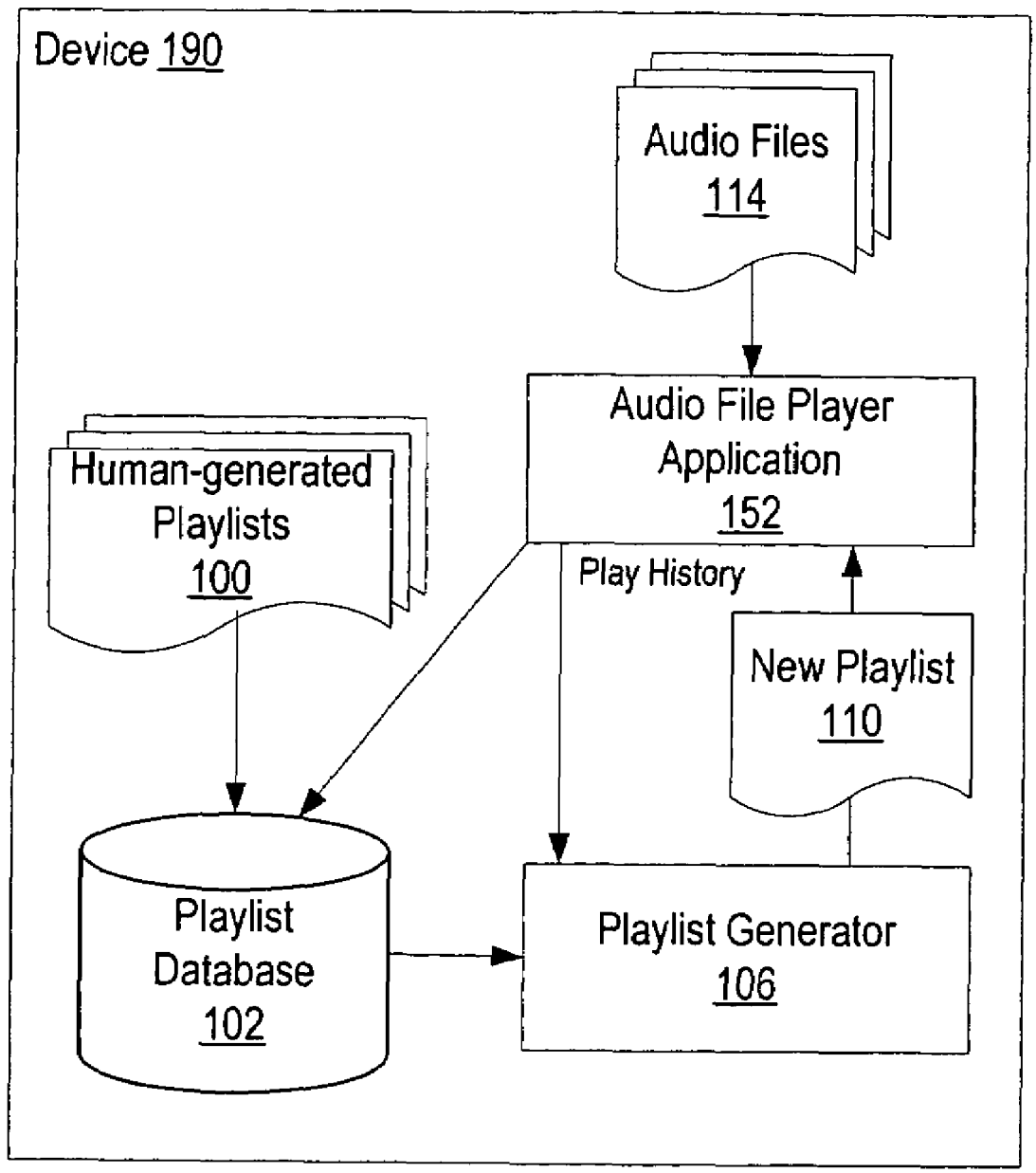
FIG. 6 illustrates an exemplary device including a playlist generator and audio file player application according to one embodiment.

FIG. 6 illustrates an exemplary device including a playlist generator and audio file player application according to one embodiment. Device 190 may, for example, be representative of a personal "desktop" or portable computer system or a portable digital audio file player. In this embodiment, the user may have a collection of audio files 114 stored on device 190 for access by audio file player application 152. In this embodiment, the playlist database 100 may be maintained in storage of the device 190. Playlists 100 generated by the user of the device 190 and/or information on play history may be stored in playlist database 102. A statistical model 104 of playlist database 102 may be generated. Thus, this embodiment may generate interesting playlists 110 for the audio files 114 in this user's collection of audio files 115 and based on previous playlists and/or play history of this particular user.

A user may play one or more audio files 114 from the collection on device 190 using audio file player application 152. A play history indicating one or more audio files 114 recently played by the user may be provided to the playlist generator 106. Playlist generator 106 may then access the statistical model of playlist database 102 to search for sequences of audio files 114 (using an N-gram statistical model) that include or begin with one or more of the audio file(s) 114 in the play history and that occur a statistically significant number of times in the statistical model 104 of playlist database 102, as previously described. The sequence of one or more next audio files 114 may then be provided to audio file player application 152 as new playlist 110. Audio file player application 152 may then play the sequence of audio files 114 in the collection as indicated by the new playlist 110.

Figure 7:
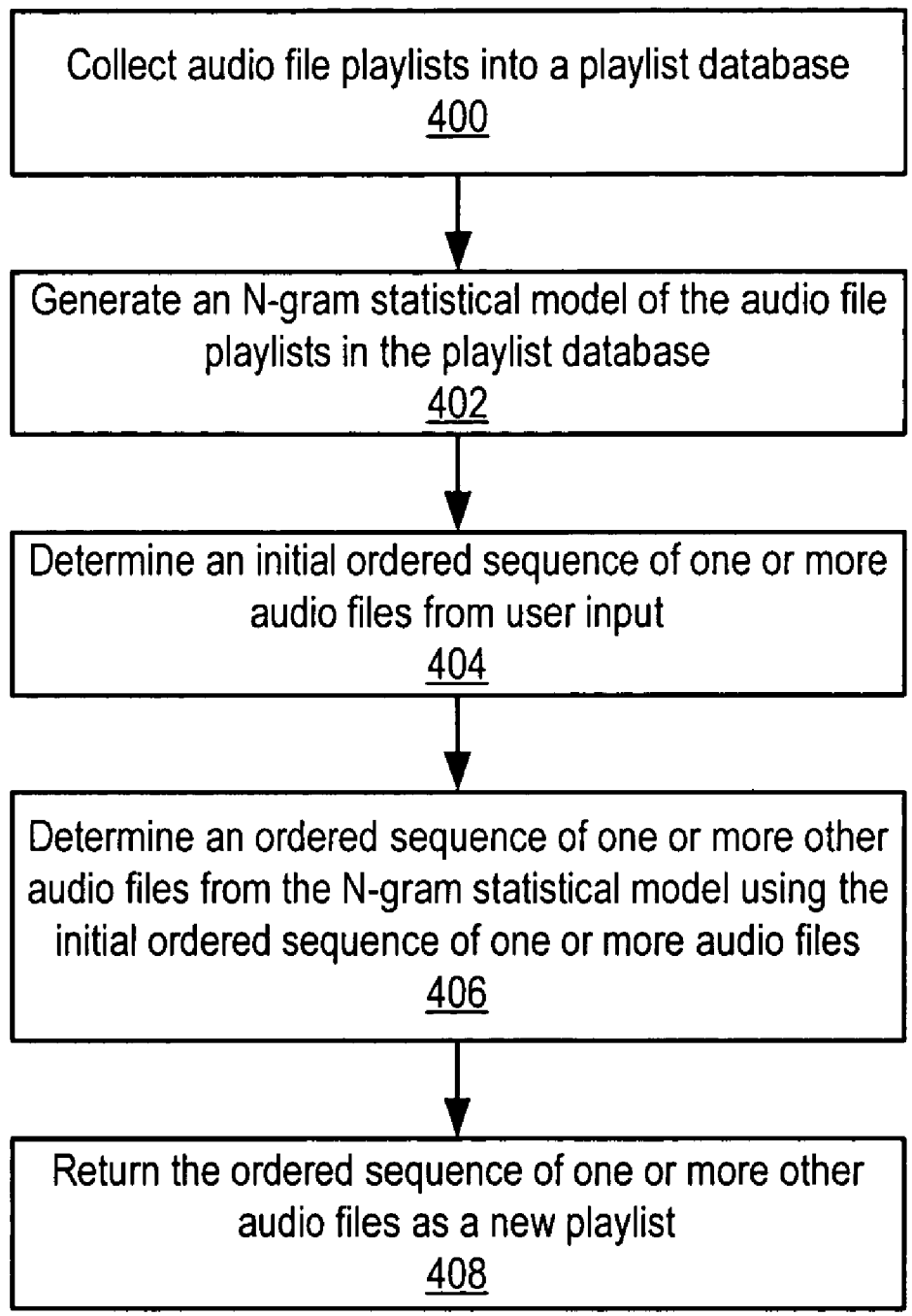
FIG. 7 is a flowchart of a method for automatically generating interesting playlists of audio files according to one embodiment.

FIG. 7 is a flowchart of a method for automatically generating interesting playlists of audio files according to one embodiment. In one embodiment, the audio files may be digital music files. As indicated at 400, audio file playlists may be collected into a playlist database. These playlists may, for example, be human-generated playlists. Each audio file playlist indicates an ordered sequence of audio files. Note that the playlists typically do not contain the digital audio content of the audio files. Instead, each playlist may contain information about the audio files, such as the name of the audio file, the artist that created the audio file, the name of the album or CD that the audio file is from, and possibly other information about the audio file. These playlists may be collected from one or more sources into the playlist database, for example from one or more Web sites on the Internet to which users of audio file players may upload and share playlists that they have created. These playlists may also be collected from the users themselves.

As indicated at 402, an N-gram statistical model of the audio file playlists in the playlist database may be generated. The N-gram statistical model models the ordering sequences of the audio files indicated in the playlists in the playlist database. From the N-gram statistical model, given an input of one or more audio files, a transition to one or more other audio files that statistically significantly follow the input audio file(s) may be determined.

As indicated at 404, an initial ordered sequence of one or more audio files may be determined. For example, a play history may be received from a portable audio file player, or from an audio file player application running on a personal computer. In one embodiment, input may be received (e.g., titles of one or more audio files, or higher-level information such as genre, artist, album, theme, etc) from which one or more audio files in the playlist database may be determined to be used as the initial ordered sequence to begin the new playlist. As indicated at 406, the initial ordered sequence of one or more audio files may be used in determining an ordered sequence of one or more other audio files from the N-gram statistical model of the playlist database that statistically significantly follows the initial ordered sequence of one or more audio files. Note that, in various embodiments, a bi-gram, tri-gram, or other higher-order N-gram model may be used in determining the ordered sequence of one or more other audio files.

When determining the ordered sequence of one or more other audio files from the N-gram statistical model, two or more candidate ordered sequences that statistically significantly follow the initial ordered sequence of one or more audio files in the playlist database may be found. Note that some embodiments may be tunable to set thresholds for which ordered sequences may be considered to statistically significantly follow an input ordered sequence of one or more audio files. In one embodiment, a candidate ordered sequence that has the highest number of occurrences where it follows the initial ordered sequence of one or more audio files may be selected. Other embodiments may use one or more of a variety of algorithms to select from among the two or more candidate ordered sequences so that a particular ordered sequence from the playlist database does not always appear after an initial ordered sequence of one or more audio files. For example, one embodiment may "randomize" selection of a candidate ordered sequence from among two or more candidates. Some embodiments may use information collected on or from the user that submitted the play history to weight selection of ordered sequences from the playlist database given an initial ordered sequence of one or more audio files. This information may include, for example, one or more parameters on personal preferences input by the user, and/or historical information collected from prior interactions with the playlist generation mechanism by the user that may indicate user preferences. This information may indicate, for example, particular genres, artists, albums, audio files, etc. that the user likes or dislikes. Note that, in this embodiment, class-based information (i.e., information on the genre, artist, album, theme, etc.) on the audio files in the playlist database may be collected and stored in conjunction with or separate from the playlist database for use in weighting selection of audio files for new playlists using the N-gram statistical model.

In some embodiments, backoff probabilities may be used in cases where there is insufficient coverage for an audio file or audio file transition. In other words, in cases where it may not be possible to determine audio file(s) for the new playlist that statistically significantly follow the initial ordered sequence of one or more audio files, or in cases where the number of candidate audio file transitions is below a specified threshold, thus limiting the possibilities, these embodiments may "fall back" on one or more other mechanisms to determine audio file transitions for the new playlist. In some embodiments, for example, the playlist generation mechanism may "fall back" on a lower-order N-gram model if there is insufficient coverage at a given order of the N-gram model. For example, if the number of candidate audio file transitions using the tri-gram model is limited, one embodiment may "fall back" to the bi-gram model to determine a larger and more diverse set of candidate audio file transitions for consideration for inclusion in the new playlist.

In some embodiments, a class-based statistical model may be used as a "backoff" for the selection of at least some audio file transitions in at least some playlists. In the class-based statistical model, higher-level statistics may be collected and maintained for the audio files that may be used in the generation of audio file transitions for playlists when audio files without sufficient coverage are encountered. These higher-level statistics may include, for example, statistics on the genre, artist, album, and theme of the audio files in the playlist database. For example, if, using a tri-gram statistical model, there is insufficient coverage in the tri-gram model for the transition (audio file A>>>audio file B) indicated by the initial ordered sequence of one or more audio files to determine a diverse set of candidate next audio files, one embodiment may "fall back" on the class-based statistical model to consider audio files in the same genre, by the same artist, from the same album, and/or of a similar theme as candidate next audio file(s) for the new playlist. Thus, falling back on the class-based statistical model may be used to determine a larger and more diverse set of candidate audio file transitions for consideration for inclusion in the new playlist in cases where the N-gram model alone provides insufficient coverage.

Note that some embodiments may use a combination of backoff probability techniques in generating playlists where there is insufficient coverage. For example, one embodiment may use a combination of "falling back" on a lower-order N-gram model and a class-based statistical model to handle situations where there is insufficient coverage.

When determining the ordered sequence of one or more other audio files (the new playlist) from the N-gram statistical model, the audio file(s) indicated by the initial ordered sequence of one or more audio files (e.g., a play history) may be used as the starting point for determining the initial audio file(s) in the playlist. After the initial audio files for the playlist are determined, a next audio file(s) may be determined from the N-gram statistical model using one or more audio files indicated at the end of the playlist itself. For example, using the tri-gram statistical model, the initial ordered sequence of one or more audio files may indicate the transition (audio file A>>>audio file B). From this transition, a next audio file C that statistically significantly follows the transition may be determined from the tri-gram model. From the transition (audio file B>>>audio file C), a next audio file D that statistically significantly follows the transition (audio file B>>>audio file C) may be determined from the tri-gram model. A next audio file E that statistically significantly follows the transition (audio file C>>>audio file D) may then be determined, and so on. In one embodiment, the process of determining audio file transitions for the playlist may continue until a specified number of audio files or a specified length in time for the playlist is reached. In one embodiment, the process of determining audio file transitions for the playlist may continue until the user of the audio file player terminates the process of determining audio file transitions to be added to the playlist.

As indicated at 408, the ordered sequence of one or more other audio files may be returned to the audio file player as a new playlist. In one embodiment, the entire playlist may be returned in one transmission. In this embodiment, for example, the user of the audio file player may request a new playlist and submit a play history, a new playlist is generated using the play history as the initial ordered sequence of one or more audio files, and the new playlist is returned to the audio file player. In one embodiment, the process of determining audio file transitions for the playlist and returning the newly-determined audio file transitions to the audio file player may continue until the user of the audio file player terminates the playlist generation process. In this embodiment, new audio file transitions may be determined for and returned to the audio file player on an "as needed" basis in two or more transmissions.

Figure 8:
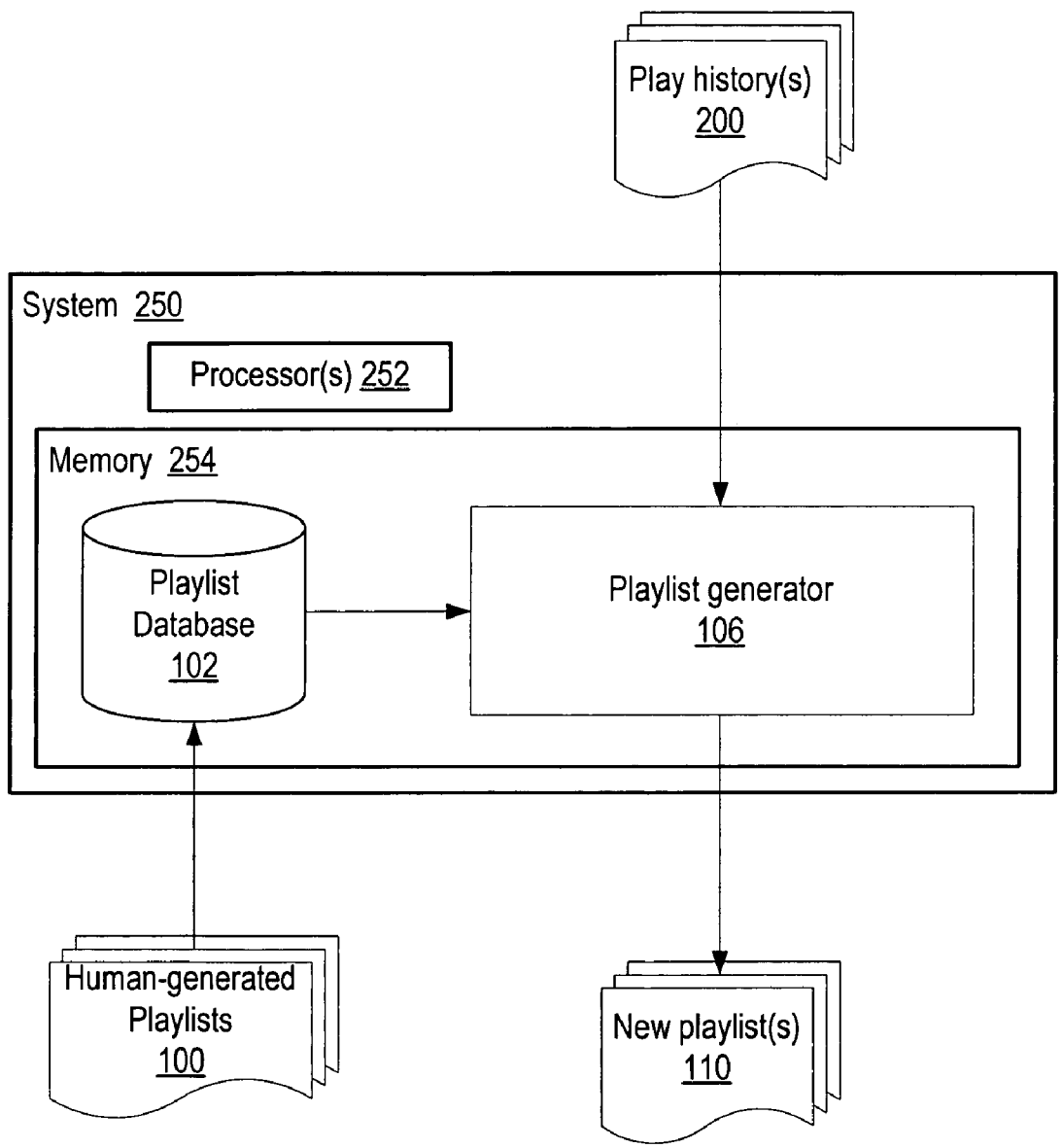
FIG. 8 illustrates a system implementing a playlist generation mechanism according to one embodiment.

FIG. 8 illustrates a system implementing a playlist generation mechanism according to one embodiment. System 250 may be any of various types of devices, including, but not limited to, a personal computer system, desktop computer, laptop or notebook computer, server computer, mainframe computer system, workstation, network computer, Portable Digital Assistant (PDA), smartphone, or other suitable device. System 250 may include at least one processor 252. The processor 252 may be coupled to a memory 254. Memory 254 is representative of various types of possible memory media, also referred to as "computer readable media" or "computer-accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory (storage device) such as a magnetic media, e.g., a hard drive or optical storage. The memory medium may include other types of memory as well, or combinations thereof.

System 250 may include, in memory 254, an instance of a playlist generator 106 as described herein. Memory 254 may also include an instance of a playlist database 102. Note that, while FIG. 8 shows playlist database 102 as residing in memory 254 within system 250, playlist database 102 may alternatively be stored on a storage device or storage system external to system 250, such as on a storage device coupled to system 250 via a network. In either case, playlist database 102 may be considered as included in memory 254 of system 250. Human-generated playlists 100 may be collected from various sources and stored in playlist database 102. A statistical model of playlist database 102 may be generated.

Play history(s) 200 indicating one or more audio files recently played by listeners on audio file players may be received by the playlist generator 106, for example via a wired or wireless network. Note that a play history 200 may include information on one, two, or more audio files that have most recently been played by a listener via an audio file player.

Upon receipt of a play history 200, playlist generator 106 may use the information on recently played audio file(s) in the play history to search for sequences of audio files (N-grams) that include or begin with one or more of the audio file(s) in the play history 200 and that occur a statistically significant number of times in the statistical model of playlist database 102. Given the sequence of played audio files in the play history, playlist N-grams may be used by playlist generator 106 to determine a set of possible next audio files and their associated probabilities based upon the occurrence of that sequence of audio files in the playlist database. In one embodiment, the most probable next audio file(s) determined using an N-gram statistical model may be included in a playlist 110. In some embodiments, various other parameters may be used to weight the probabilities of audio files of the possible next audio files 114. In one embodiment, as previously described, backoff probabilities may be used in handling cases where there is sparse data in playlist database 102 for an audio file. Further, information collected from a listener's prior interactions with playlist generator 106 may be used in weighting possible next audio files for selecting audio files to be included or excluded from a playlist 110.

A sequence of one or more next audio files to be played by an audio file player may then be returned as a new playlist 110. The audio file player may then play the sequence of audio files as indicated by the new playlist 110.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for automatically generating playlists of audio files, the method comprising:
    collecting a plurality of audio file playlists into a playlist database, wherein each audio file playlist indicates an ordered sequence of audio files;
    generating an N-gram statistical model of the audio file playlists in the playlist database, wherein the N-gram statistical model models ordering sequences of the audio files indicated in the playlists;
    receiving a request to generate a new playlist; and
    in response to receiving the request:

determining an initial ordered sequence of one or more audio files; and generating a new playlist comprising an ordered sequence including an indication of one or more of the audio files from the playlist database, wherein said generating a new playlist comprises applying the initial ordered sequence to the N-gram statistical model.

2. The method as recited in claim 1, the method further comprising providing the new playlist to an audio file player.

3. The method as recited in claim 2, wherein the audio file player is a portable audio file player.

4. The method as recited in claim 1, wherein the plurality of audio file playlists includes human-generated playlists.

5. The method as recited in claim 1, wherein the request includes information indicating the initial ordered sequence of one or more audio files.

6. The method as recited in claim 1, wherein the request includes audio file class information for determining an initial ordered sequence of one or more audio files, and wherein said determining an initial ordered sequence of one or more audio files comprises selecting one or more audio files as the initial ordered sequence according to the class information in the request.

7. The method as recited in claim 1, wherein the N-gram statistical model is a bi-gram model of the playlist database, and wherein said generating a new playlist comprises applying the initial ordered sequence to the bi-gram model.

8. The method as recited in claim 1, wherein the N-gram statistical model is a tri-gram model, and wherein said generating a new playlist comprises applying the initial ordered sequence to the tri-gram model.

9. The method as recited in claim 1, wherein said generating a new playlist comprises, if there is insufficient coverage in the N-gram statistical model for the initial ordered sequence of one or more audio files, applying the initial ordered sequence to a lower-level N-gram statistical model of the playlist database.

10. The method as recited in claim 1, further comprising generating a class-based statistical model of the playlist database, wherein the class-based statistical model comprises higher-level statistics for the audio files indicated by the playlists in the playlist database, and wherein the higher-level statistics are derived from information about the audio files indicated by the playlists other than ordering sequences.

11. The method as recited in claim 10, wherein the audio files are digital music files, and wherein the information about the audio files indicated by the playlists includes album information, artist information, genre information, and thematic information.

12. The method as recited in claim 10, wherein said generating a new playlist comprises, if there is insufficient coverage in the N-gram statistical model for the initial ordered sequence of one or more audio files, applying the initial ordered sequence to the class-based statistical model of the playlist database.

13. The method as recited in claim 1, further comprising:
receiving user-specific data indicating one or more audio file listening preferences of a user that generated the request; and
in said generating a new playlist comprising an ordered sequence including an indication of one or more of the audio files from the playlist database, weighting selection of the one or more of the audio files from the playlist database according to one or more of the audio file listening preferences of the user.

14. A system, comprising:
one or more processors; and
a memory comprising program instructions executable by the one or more processors to:
receive a request to generate a new playlist; and
in response to receiving the request:
determine an initial ordered sequence of one or more audio files; and
generate a new playlist comprising an ordered sequence including an indication of one or more of the audio files from a playlist database, wherein said generating a new playlist comprises applying the initial ordered sequence to an N-gram statistical model of the playlist database;
wherein the playlist database comprises a plurality of audio file playlists, wherein each audio file playlist indicates an ordered sequence of audio files; and
wherein the N-gram statistical model models ordering sequences of the audio files indicated in the playlists.

15. The system as recited in claim 14, wherein the plurality of audio file playlists includes human-generated playlists.

16. The system as recited in claim 14, wherein the request includes information indicating the initial ordered sequence of one or more audio files.

17. The system as recited in claim 14, wherein the request includes audio file class information for determining an initial ordered sequence of one or more audio files, and wherein, to determine an initial ordered sequence of one or more audio files, wherein the program instructions are further configured to select one or more audio files as the initial ordered sequence according to the class information in the request.

18. The system as recited in claim 14, wherein, to generate a new playlist, the program instructions are further executable by the processor to, if there is insufficient coverage in the N-gram statistical model for the initial ordered sequence of one or more audio files, apply the initial ordered sequence to a lower-level N-gram statistical model of the playlist database.

19. The system as recited in claim 14,
wherein, to generate a new playlist, the program instructions are further executable by the processor to, if there is insufficient coverage in the N-gram statistical model for the initial ordered sequence of one or more audio files, apply the initial ordered sequence to a class-based statistical model of the playlist database;
wherein the class-based statistical model comprises higher-level statistics for the audio files indicated by the playlists in the playlist database, wherein the higher-level statistics are derived from information about the audio files indicated by the playlists other than ordering sequences.

20. A computer-accessible medium, comprising program instructions, wherein the program instructions are computer-executable to implement a playlist generation mechanism configured to:
receive a request to generate a new playlist; and
in response to receiving the request:
determine an initial ordered sequence of one or more audio files; and
generate a new playlist comprising an ordered sequence including an indication of one or more of the audio files from a playlist database, wherein said generating a new playlist comprises applying the initial ordered sequence to an N-gram statistical model of the playlist database;
wherein the playlist database comprises a plurality of audio file playlists, wherein each audio file playlist indicates an ordered sequence of audio files; and wherein the N-gram statistical model models ordering sequences of the audio files indicated in the playlists.

21. The computer-accessible medium as recited in claim 20, wherein the plurality of audio file playlists includes human-generated playlists.

22. The computer-accessible medium as recited in claim 20, wherein the request includes information indicating the initial ordered sequence of one or more audio files.

23. The computer-accessible medium as recited in claim 20, wherein the request includes audio file class information for determining an initial ordered sequence of one or more audio files, and wherein, to determine an initial ordered sequence of one or more audio files, the playlist generation mechanism is further configured to select one or more audio files as the initial ordered sequence according to the class information in the request.

24. The computer-accessible medium as recited in claim 20, wherein, to generate a new playlist, the playlist generation mechanism is further configured to, if there is insufficient coverage in the N-gram statistical model for the initial ordered sequence of one or more audio files, apply the initial ordered sequence to a lower-level N-gram statistical model of the playlist database.

25. The computer-accessible medium as recited in claim 20,
wherein, to generate a new playlist, the playlist generation mechanism is further configured to, if there is insufficient coverage in the N-gram statistical model for the initial ordered sequence of one or more audio files, apply the initial ordered sequence to a class-based statistical model of the playlist database;
wherein the class-based statistical model comprises higher-level statistics for the audio files indicated by the playlists in the playlist database, wherein the higher-level statistics are derived from information about the audio files indicated by the playlists other than ordering sequences.

\* \* \* \* \*